(12) United States Patent
Kohl et al.

(10) Patent No.: US 11,834,018 B2
(45) Date of Patent: Dec. 5, 2023

(54) METHOD FOR OPERATING A BRAKING SYSTEM AND BRAKING SYSTEM

(71) Applicant: Continental Teves AG & Co. OHG, Frankfurt (DE)

(72) Inventors: Andreas Kohl, Frankfurt (DE); Thorsten Wickenhöfer, Frankfurt (DE)

(73) Assignee: Continental Teves AG & Co. OHG, Frankfurt am Main (DE)

( * ) Notice: Subject to any disclaimer, the term of this patent is extended or adjusted under 35 U.S.C. 154(b) by 510 days.

(21) Appl. No.: 16/565,727

(22) Filed: Sep. 10, 2019

(65) Prior Publication Data

US 2020/0001846 A1     Jan. 2, 2020

Related U.S. Application Data

(63) Continuation of application No. PCT/EP2018/055438, filed on Mar. 6, 2018.

(30) Foreign Application Priority Data

Mar. 20, 2017    (DE) ..................... 10 2017 204 559.0

(51) Int. Cl.
     *B60T 8/40*            (2006.01)
     *B60T 13/68*          (2006.01)
     (Continued)

(52) U.S. Cl.
CPC ............ *B60T 13/686* (2013.01); *B60T 7/042* (2013.01); *B60T 13/745* (2013.01); *B60T 17/22* (2013.01); *B60T 2270/82* (2013.01)

(58) Field of Classification Search
CPC .... F16D 65/0006; B60T 8/4081; B60T 7/042; B60T 2270/82; B60T 13/662; B60T 13/68; B60T 13/686; B60T 13/745
See application file for complete search history.

(56) References Cited

U.S. PATENT DOCUMENTS

2005/0116534 A1*   6/2005   Drott ..................... B60T 17/222
                                                                                             303/3
2006/0103234 A1*   5/2006   Jeong ...................... B60T 7/22
                                                                                             303/89

(Continued)

FOREIGN PATENT DOCUMENTS

CN             2652742 Y      11/2004
CN         102481914 A       5/2012
(Continued)

OTHER PUBLICATIONS

Search Report dated Oct. 1, 2019 from corresponding German Patent Application No. DE 10 2017 204 559.0.

(Continued)

*Primary Examiner* — Robert A. Siconolfi
*Assistant Examiner* — Stephen M Bowes

(57) ABSTRACT

A braking system for vehicles includes wheel brakes, a pressure-providing device for actuating the wheel brakes, a master brake cylinder having a primary pressure chamber, a secondary pressure chamber, and a secondary piston. The primary pressure chamber is separated from a first set of the wheel brakes by a first, normally open separating valve, and the secondary pressure chamber is separated from a second set of the wheel brakes by a second, normally open separating valve. A pressure medium reservoir is connected to the secondary pressure chamber in the unactuated state of the secondary piston, the braking system is activated in order to actively build up pressure in the brakes in a by-wire operating mode by the pressure-providing device. In the event of a pressure medium surplus in the wheel brakes, the second separating valve is opened if a release of the brake pedal by the driver is detected.

10 Claims, 1 Drawing Sheet

(51) Int. Cl.
*B60T 7/04* (2006.01)
*B60T 13/74* (2006.01)
*B60T 17/22* (2006.01)

(56) References Cited

U.S. PATENT DOCUMENTS

| | | | |
|---|---|---|---|
| 2008/0284240 A1* | 11/2008 | Jeong | B60T 7/12 |
| | | | 303/11 |
| 2011/0082633 A1* | 4/2011 | Kaster | B60T 8/4275 |
| | | | 701/83 |
| 2012/0109482 A1* | 5/2012 | Yoshii | B60T 7/12 |
| | | | 701/70 |
| 2012/0169112 A1 | 7/2012 | Jungbecker et al. | |
| 2015/0061854 A1 | 3/2015 | Drumm et al. | |
| 2015/0120159 A1* | 4/2015 | O'Leary | B60T 7/04 |
| | | | 701/70 |
| 2015/0367823 A1* | 12/2015 | Benzler | B60T 8/4031 |
| | | | 303/10 |
| 2016/0016572 A1* | 1/2016 | Higashi | B60T 13/161 |
| | | | 303/10 |
| 2016/0152219 A1 | 6/2016 | Besier et al. | |
| 2018/0178772 A1* | 6/2018 | Foitzik | B60T 13/686 |

FOREIGN PATENT DOCUMENTS

| | | |
|---|---|---|
| CN | 1958358 A | 5/2017 |
| DE | 102013204778 A1 | 9/2013 |
| DE | 102013222281 A1 | 11/2014 |
| JP | 2000280880 A * | 10/2000 |
| JP | 2010013068 A | 1/2010 |
| JP | 2014227056 A | 12/2014 |

OTHER PUBLICATIONS

Koran Decision for Grant of Patent dated Apr. 28, 2021 for the counterpart Korean Patent Application No. 10-2019-7026162.
International Search Report and Written Opinion dated May 7, 2018 from corresponding International Patent Application No. PCT/EP2018/055438.
Office Action dated May 6, 2021 from corresponding Chinese patent application No. 201880019416.4.

* cited by examiner

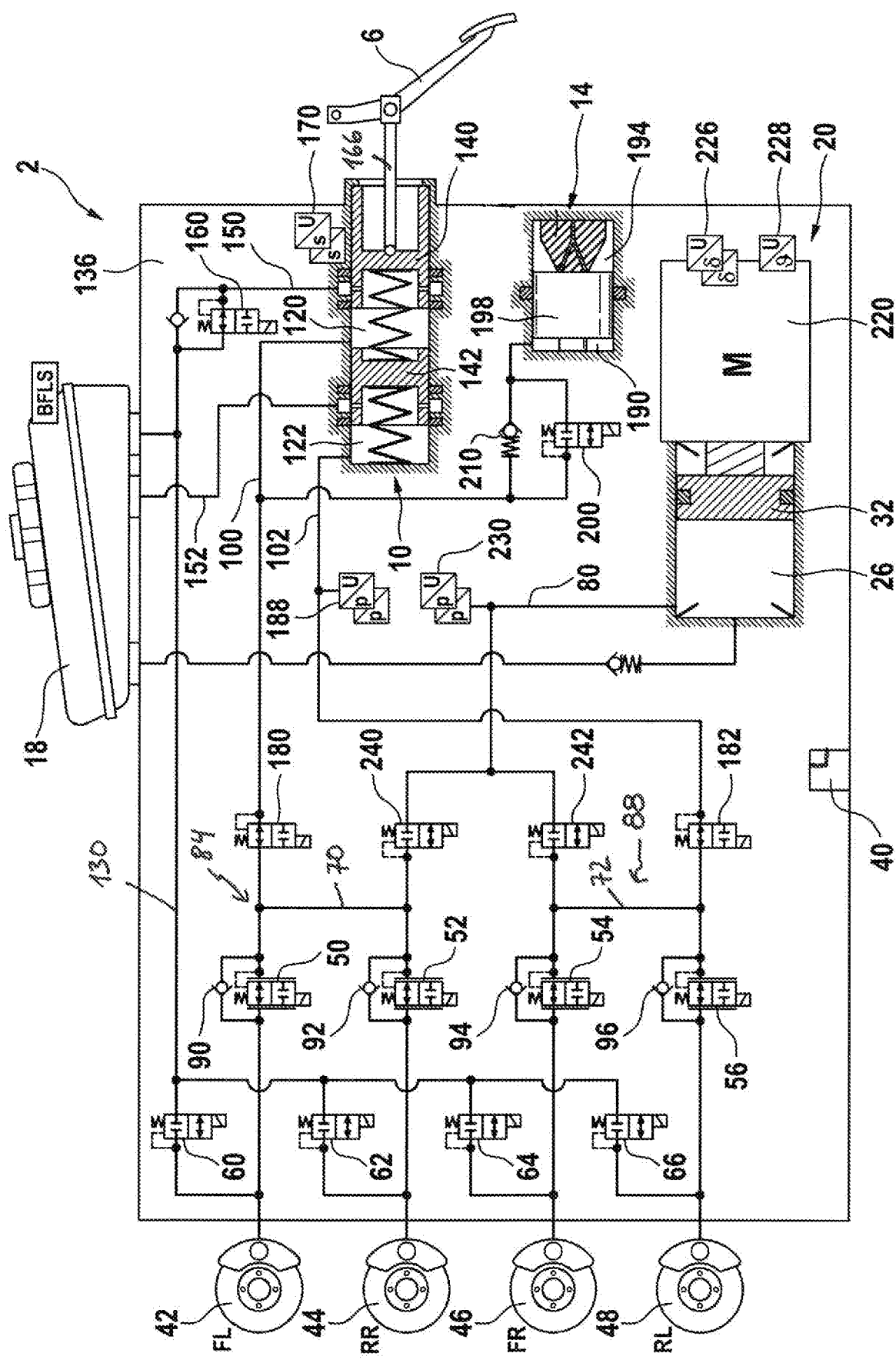

METHOD FOR OPERATING A BRAKING SYSTEM AND BRAKING SYSTEM

CROSS REFERENCE TO RELATED APPLICATIONS

This application is a continuation application of PCT International Application No. PCT/EP2018/055438, filed Mar. 6, 2018, which claims priority to German Patent Application No. DE 10 2017 204 559.0, filed Mar. 20, 2017, wherein the contents of such applications are incorporated herein by reference.

TECHNICAL FIELD

A method for operating a braking system for motor vehicles.

TECHNICAL BACKGROUND

In motor vehicle engineering, electrohydraulic "brake-by-wire" brake assemblies are being used ever more widely. Brake assemblies of this kind often have not only a master brake cylinder that can be actuated by the vehicle driver but also an electrically activatable pressure-providing device (activatable "by-wire"), by the wheel brakes are pressurized in the "brake-by-wire" operating mode.

In these electrohydraulic braking systems, the driver can be decoupled from direct access to the wheel brakes. This function is used in a "brake-by-wire" operating mode. When the pedal is actuated, the driver's braking request is detected and a pedal decoupling unit and simulator are activated. The hydraulic volume displaced from the master brake cylinder by the driver by pedal actuation flows into the simulator, which serves to give the driver as reliable and comfortable a brake pedal feel as possible. The braking request detected by sensors leads to the determination of a nominal braking effect, from which the nominal brake pressure for the brakes is then determined. The corresponding actual brake pressure is then actively provided by an electrically actuatable pressure-providing device.

The actual braking is thus achieved by active pressure build-up in the brake circuits by means of the pressure-providing device, which is activated by a control and regulation unit. In brake systems of this kind, because the brake pedal actuation is hydraulically decoupled from the pressure build-up in the wheel brakes, many functionalities such as ABS, ESC, TCS, slope launch assistance etc. can be implemented in a manner which is technically efficient and particularly comfortable for the driver because of the pedal decoupling.

In such brake systems, a hydraulic fall-back level is usually provided, by means of which the driver can brake or halt the vehicle by muscle power by actuating the brake pedal if the "by-wire" operating mode fails or is disrupted. Whereas, in the normal mode, the above-described hydraulic decoupling between brake pedal actuation and brake pressure build-up at the wheel brakes is realized by means of a pedal decoupling unit, this decoupling is eliminated in the fall-back level, thus enabling the driver to directly displace pressure medium into the brake circuits or wheel brakes. A switch is made to the fall-back level if it is no longer possible to build up pressure with the aid of the pressure-providing device. This is the case inter alia if a check valve that connects the pressure-providing device to a reservoir no longer reliably shuts off, such that a pressure build-up is no longer reliably possible.

The pressure-providing device in the brake systems described above is also referred to as an actuator or electrohydraulic actuator. For example, an electrohydraulic actuator is formed by an electromechanical linear actuator which displaces a piston axially in a hydraulic pressure chamber in order to build up pressure. The electromechanical linear actuator is usually formed by the combination of an electric motor with a rotation-translation gear mechanism.

DE 10 2013 204 778 A1 relates to a "brake-by-wire" brake assembly for motor vehicles which comprises a tandem master brake cylinder which can be actuated by means of a brake pedal and the pressure chambers of which are in each case connected, separably by means of an electrically actuatable separating valve, to a brake circuit with two wheel brakes, an activatable and deactivatable simulation device which is hydraulically connected to the master brake cylinder, and an electrically controllable pressure-providing device which is formed by a piston-cylinder arrangement with a hydraulic pressure chamber, the piston of which is displaceable by an electromechanical linear actuator, wherein the pressure-providing device is connected to brake circuit supply lines via two electrically actuatable activation valves.

The braking system is activated, for example by actuation of the ignition, so that it switches to the by-wire operating mode. It may occur that the driver has already actuated the brake pedal before activation of the by-wire operating mode, and in this way has displaced brake fluid from the master brake cylinder in the direction of the wheel brakes. If the system is woken while the brake pedal is actuated and after actuation switches to by-wire mode, this causes a mismatch of the volume balance in the hydraulics, which means that the existing volume can no longer be adequately dissipated when the pedal is released since the linear actuator can only absorb again the volume which it has itself displaced, but not the volume already displaced by the driver. In order to dissipate this surplus volume, normally the outlet valves are actuated. This however causes perceptible noise which can lead to irritation and disturbance to the driver, and finally can lead to complaints. If the outlet valves are also opened when there is a very slight pressure difference, the problem of soiling exists and as a result leakage can occur.

SUMMARY

A braking system and a method for operating a braking system in that surplus volumes are dissipated with significantly less noise. It is furthermore sought to specify a corresponding braking system.

A braking system for motor vehicles includes wheel brakes, an electrically controllable pressure-providing device for hydraulically actuating the wheel brakes, a master brake cylinder having a primary pressure chamber, a secondary pressure chamber, and a floatingly mounted secondary piston. The primary pressure chamber can be hydraulically separated from a first set of the wheel brakes by a first, normally open separating valve, and the secondary pressure chamber can be hydraulically separated from a second set of the wheel brakes by a second, normally open separating valve. The system further includes a pressure medium reservoir connected to the secondary pressure chamber of the master brake cylinder in the unactuated state of the secondary piston. The system also includes a hydraulically designed simulator, wherein the braking system is activated in order to actively build up pressure in the wheel brakes in a by-wire operating mode by the pressure-providing device.

In the event of a pressure medium surplus in the wheel brakes, the second separating valve is opened in the by-wire operating mode if a release of the brake pedal by the driver is detected, so that surplus pressure medium can flow into the secondary pressure chamber.

With reference to the method, in the event of a pressure medium surplus in the wheel brakes, the second separating valve is opened in the by-wire operating mode if a release of the brake pedal by the driver is detected, so that surplus pressure medium can flow into the secondary pressure chamber.

BRIEF DESCRIPTION OF THE DRAWING

FIG. 1 shows a schematic view of a braking system according to one or more embodiments.

These and other embodiments, aspects, advantages, and features of the present invention will be set forth in part in the description which follows and will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims and their equivalents.

DETAILED DESCRIPTION OF THE EMBODIMENTS

The following detailed description includes references to the accompanying drawings, which form a part of the detailed description. The drawings show, by way of illustration, specific embodiments in which the apparatus may be practiced. These embodiments, which are also referred to herein as "examples" or "options," are described in enough detail to enable those skilled in the art to practice the present embodiments. The embodiments may be combined, other embodiments may be utilized, or structural or logical changes may be made without departing from the scope of the invention. The following detailed description is, therefore, not to be taken in a limiting sense and the scope of the invention is defined by the appended claims and their legal equivalents.

Surplus brake volume is dissipated on activation of the by-wire braking system on a mismatch of the volume balance, irritates or disturbs the driver. The opening of the outlet valves is normally associated with loud noises which the driver does not expect and which gives them an uncomfortable feeling, or inaccurately suggests that the braking system is faulty. It would therefore be desirable to dissipate the surplus volume soundlessly but nonetheless reliably. Also, the outlet valves should be actuated rarely, in particular if only slight pressure differences exist, so as not to unnecessarily shorten their service life and so as to avoid soiling of the valve seat.

It has now been found that this can be achieved if the surplus volume is displaced into the secondary pressure chamber of the brake master cylinder. This process takes place substantially soundlessly and leads to no perceptible disturbance for the driver. If pressure medium flows into the secondary pressure chamber, the secondary piston is pushed back into its starting or release position so that the hydraulic connection is opened between the secondary pressure chamber and the pressure medium reservoir through the openings in the tandem master brake cylinder, known as blow holes. In this way, pressure medium can flow out of the secondary pressure chamber into the pressure medium reservoir.

A pressure medium surplus or brake fluid surplus here means a pressure medium volume which can no longer be absorbed in by-wire operation when the brake pedal is not actuated or the volume of the pressure chamber of the pressure-providing device is already filled to maximum.

In one or more embodiments, the braking system comprises at least one electrically actuatable wheel valve per wheel brake for setting wheel-individual brake pressures.

Advantageously, an elastic element which loads the secondary piston is arranged in the secondary pressure chamber. The secondary piston which is mounted in floating fashion is moved into its rest position by the elastic element, which is optionally formed as a spring, when the brake pedal is not actuated. In its rest position, the floating piston opens passage bores to the brake fluid reservoir, known as "blow holes", through which the surplus brake fluid can flow soundlessly into the brake fluid reservoir.

The pedal position, i.e. the current position of the brake pedal, is observed or determined by means of a pedal travel sensor. The pedal travel sensor is advantageously configured in redundant fashion so that the reliability of its signal can be checked during operation. Release of the brake pedal is detected when the pedal travel is less than a predefined pedal travel threshold value, and/or when the pedal release speed lies below a predefined negative pedal release gradient and the pedal is moved in the direction of the release position.

The second separating valve remains open until a braking request by the driver is detected, and only then is it closed again. Then the first separating valve is also closed so that the tandem master brake cylinder is hydraulically decoupled from the wheel brakes, so that in by-wire operation, pressure can actively be built up by means of the pressure-providing device.

The second separating valve remains open until a braking request by the driver is detected. In particular, the second separating valve remains open until the predefined pedal travel threshold value has been exceeded. This threshold value is smaller than the travel necessary to close the openings (blow holes) in the secondary pressure chamber which connect this chamber hydraulically to the pressure medium reservoir when the secondary piston is not activated. In by-wire operation, the separating valves are thus closed when the pedal travel exceeds a predefined pedal travel threshold value. Thus pressure can be built up actively on the basis of a braking request from the driver in brake-by-wire operation.

The second separating valve is held closed until the pedal travel has fallen below a pedal travel threshold value. The driver has ended the braking by releasing the pedal, and the separating valves return to their normally open state.

If however actuation occurs before the system has been activated, the sensor does not sense the brake pedal travel and the separating valves are not activated.

The presence of a pressure medium surplus is detected if the pressure-providing device senses that it cannot build up the complete pressure alone.

With reference to the braking system, the above-mentioned method is achieved with a means for performing a method as described above. In particular, an electronic control and regulating unit is provided in which the method is implemented by software and/or hardware.

The advantages include that, with the proposed method, surplus brake volume can be dissipated with low noise so that the driver is neither irritated nor disturbed. Since the outlet valves need not be open for this, these are protected so that the service life of the braking system is extended.

Referring to FIG. 1, the braking system 2 comprises a master brake cylinder 10 which can be actuated by means of an actuation pedal or brake pedal 6, a simulation device 14 cooperating with the master brake cylinder 10, a pressure medium reservoir 18 assigned to the master brake cylinder 10 and standing under atmospheric pressure, an electrically controllable pressure-providing device 20 which is formed by a cylinder-piston arrangement with a hydraulic pressure chamber 26, the piston 32 of which can be displaced by an electromechanical actuator, an electrically controllable pressure-modulation device for setting wheel-individual brake pressures, and an electronic control and regulating unit 40.

The pressure-modulation device (not designated in more detail) comprises for example hydraulically actuatable wheel brakes 42, 44, 46, 48, and for each actuatable wheel brake 42 to 48 a respective inlet valve 50, 52, 54, 56 and an outlet valve 60, 62, 64, 66 which are connected together hydraulically in pairs via central connections and connected to the wheel brakes 42 to 48. The input connections of the inlet valves 50 to 56 are supplied with pressures by means of brake circuit supply lines 70, 72; in a "brake-by-wire" operating mode, these pressures are derived from a system pressure which is present in a system pressure line 80 connected to the pressure chamber 26 of the pressure-providing device 20, and corresponds to the pressure provided by the pressure-providing device. Here, the brakes 42, 44 are hydraulically connected to a first brake circuit 84, and the brakes 46, 48 are hydraulically connected to a second brake circuit 88.

A respective check valve 90, 92, 94, 96 which opens towards the brake circuit supply lines 70, 72 is connected in parallel to each inlet valve 50 to 56. In fall-back operating mode, the brake circuit supply lines 70, 72 are loaded with the pressures of the brake medium from pressure chambers 120, 122 of the master brake cylinder 10 via hydraulic lines 100, 102. The output connections of the outlet valves 60 to 66 are connected to the brake medium reservoir 18 via a return line 130.

The master brake cylinder 10 has, in a housing 136, two pistons 140, 142 which are arranged in series and which delimit the hydraulic pressure chambers 120, 122. The pressure chambers 120, 122 are connected on one side to the pressure medium reservoir 18 via radial bores formed in the pistons 140, 142 and via corresponding pressure-balancing lines 150, 152, wherein the connections can be shut off by a relative movement of the pistons 140, 142 in the housing 136. On the other side, the pressure chambers 120, 122 are connected to the above-mentioned brake circuit supply lines 70, 72 by means of hydraulic lines 100, 102.

A normally open valve 160 is situated in the pressure-balancing line 150. The pressure chambers 120, 122 contain restoring springs (not designated specifically), which position the pistons 140, 142 in a starting position when the master brake cylinder 10 is not actuated. A piston rod 166 couples the pivot movement of the brake pedal 6 due to pedal actuation to the translation movement of the first master brake cylinder piston 140 or primary piston, the actuation travel of which is detected by a travel sensor 170, configured in redundant fashion. In this way, the corresponding piston travel signal is a measure of the brake pedal actuation angle. It represents a braking request by the vehicle driver.

A separating valve 180, 182 which is configured as an electrically actuatable, normally open, 2/2-way directional control valve is arranged in each line portion 100, 102 connected to the pressure chambers 120, 122. The separating valves 180, 182 can shut off the hydraulic connection between the pressure chambers 120, 122 of the master brake cylinder 10 and the brake circuit supply lines 70, 72. A pressure sensor 188 connected to the line portion 102 detects the pressure built up in the pressure chamber 122 by movement of the second piston 142.

The simulation device 14 can be coupled hydraulically to the master brake cylinder 10 and substantially comprises for example a simulator chamber 190, a simulator spring chamber 194, and a simulator piston 198 separating the two chambers 190, 194 from each other. This simulator piston 198 is supported on the housing 136 by an elastic element (e.g. a spring) arranged in the simulator spring chamber 194 and advantageously preloaded. The simulator chamber 190 is connectable to the first pressure chamber 120 of the master brake cylinder 10 by means of an electrically actuatable simulator valve 200. When a pedal force is input and simulator valve 200 is open, pressure medium flows from the master brake cylinder pressure chamber 120 into the simulator chamber 190. A check valve 210 arranged hydraulically antiparallel to the simulator valve 200 allows the pressure medium to flow back from the simulator chamber 190 to the master brake cylinder pressure chamber 120 largely unhindered, irrespective of the switching state of the simulator valve 200. Other embodiments and connections of the simulation device to the master brake cylinder 10 are conceivable.

The electrically controllable pressure-providing device 20 is configured as a hydraulic cylinder-piston arrangement or a single circuit electrohydraulic actuator, in which the pressure piston 32 delimiting the pressure chamber 26 can be actuated by an electric motor 220 (indicated diagrammatically) with the interposition of a rotation-translation gear mechanism (also indicated diagrammatically) which is configured as a ball screw drive (KGT). A rotor position sensor (indicated merely diagrammatically) serving to detect the rotor position of the electric motor 220 carries reference sign 226. In addition, a temperature sensor 228 may be used for sensing the temperature of the motor winding.

The actuator pressure generated by the effect of the force of the piston 32 on the pressure medium enclosed in the pressure chamber 26 is fed into the system pressure line 80 and detected by means of a pressure sensor 230, which is of redundant design. When the pressure switching valves 240, 242 are opened, the pressure medium reaches the wheel brakes 42 to 48 and actuates them. A wheel brake pressure is built up and dissipated for all wheel brakes 42 to 48 by the forward and return movement of the piston 32, when the pressure actuation valves 240, 242 are opened, in normal braking in brake-by-wire operating mode.

When the pressure dissipates, the pressure medium previously displaced from the pressure chamber 26 into the wheel brakes 42 to 48 returns to the pressure chamber 26 on the same route. In contrast, when braking with different wheel brake pressures for each individual wheel which are regulated using the inlet and outlet valves 50 to 56, 60 to 66 (e.g. on ABS braking), the part of the pressure medium discharged via the outlet valves 60 to 66 flows into the pressure medium reservoir 18 and is therefore no longer available initially to the pressure-providing device 20 for actuating the wheel brakes 42 to 48.

When the brake pedal 6 is actuated, pressure medium or brake fluid is displaced from the chambers 120, 122 towards the wheel brakes 42, 44, 46, 48. It may also occur that the driver actuates the brake pedal 6 before the braking system 2 is activated, i.e. switched into brake-by-wire mode. If the braking system 2 is then activated, there is a mismatch in the volume balance in the hydraulics which means that the existing volume can no longer be adequately dissipated when the pedal is released.

In order to adjust the volume balance in the presence of a pressure medium surplus without opening the outlet valves 60 to 66 (which could lead to severe disturbance to the driver), the separating valve 182 is opened when it is detected that the driver releases the brake pedal 6 again after a braking process. The pedal travel is sensed using the pedal travel sensor 170. The release of the brake pedal 6 is detected when the pedal travel falls below a predefined pedal travel threshold value. When the separating valve 182 opens, brake medium flows back to the second chamber 122. This pushes the secondary piston 142 back, i.e. in the direction of its unactuated state. When this state is reached, the hydraulic access ("blow hole") to the pressure medium reservoir 18 opens and the pressure medium can escape into the pressure medium reservoir 18. Since the secondary piston 142 is working against a spring during this process, it is initially compressed before the process becomes evident at the primary piston 140. Thus the driver feels no back-pressure or only a very little back-pressure at the brake pedal, so the adjustment to the hydraulic volume balance takes place largely comfortably and quietly.

After performing the method, the brake fluid volume balance in the braking system is balanced again, so that as long as the braking system remains in the by-wire mode, the method need not usually be repeated.

The above description is intended to be illustrative, and not restrictive. Many other embodiments will be apparent to those of skill in the art upon reading and understanding the above description. Embodiments discussed in different portions of the description or referred to in different drawings can be combined to form additional embodiments of the present application. The scope should, therefore, be determined with reference to the appended claims, along with the full scope of equivalents to which such claims are entitled.

The invention claimed is:

1. A braking system for motor vehicles, comprising:
   hydraulically actuatable wheel brakes;
   an electrically controllable pressure-providing device configured to hydraulically actuate the hydraulically actuatable wheel brakes by actuation of an electric motor in a brake-by-wire operation;
   a system pressure line connecting the electrically controllable pressure-providing device and the hydraulically actuatable wheel brakes;
   a master brake cylinder configured to hydraulically actuate the hydraulically actuatable wheel brakes by actuation of a brake pedal;
   a hydraulic line connecting the master brake cylinder and the hydraulically actuatable wheel brakes;
   a separating valve disposed between at least one wheel brake of the hydraulically actuatable wheel brakes and the master brake cylinder along the hydraulic line;
   a pressure medium reservoir under atmospheric pressure, the pressure medium reservoir hydraulically connected to the master brake cylinder via a pressure-balancing line; and
   at least one sensor configured to detect a pressure medium surplus in which a pressure medium volume provided to the at least one wheel brake is unable to be absorbed by the electrically controllable pressure-providing device in the brake-by-wire operation,
   wherein the separating valve is controlled to open a connection between the at least one wheel brake and the master brake cylinder in response to detecting the pressure medium surplus in the brake-by-wire operation to discharge the pressure medium surplus to the pressure medium reservoir via the hydraulic line, the master brake cylinder, and the pressure-balancing line.

2. The braking system of claim 1, wherein the master brake cylinder comprises:
   a primary piston;
   a primary pressure chamber into which the primary piston is pushed by actuation of the brake pedal; and
   a secondary piston; and
   a secondary pressure chamber in series with the primary pressure chamber within the master brake cylinder, the secondary pressure chamber connected to the at least one wheel brake via the hydraulic line.

3. The braking system of claim 2, wherein the pressure-balancing line comprises a primary pressure-balancing line and a secondary pressure-balancing line, and
   wherein the master brake cylinder further comprises:
   a piston rod to which the primary piston is coupled, the piston rod translating the actuation of the brake pedal pushing the primary piston into the primary pressure chamber;
   a primary passage bore in the primary pressure chamber connected to the primary pressure-balancing line; and
   a secondary passage bore in the secondary pressure chamber connected to the secondary pressure-balancing line.

4. The braking system of claim 3, wherein the master brake cylinder further comprises:
   an elastic element coupled to the secondary piston, the elastic element loading the secondary piston arranged in the secondary pressure chamber, and the elastic element positioning the secondary piston in a rest position at which the secondary passage bore is opened to the secondary pressure chamber to discharge the pressure medium surplus to the pressure medium reservoir.

5. The braking system of claim 4, wherein the elastic element comprises a spring.

6. The braking system of claim 4, wherein the rest position is an unactuated state of the secondary piston.

7. The braking system of claim 4, further comprising a sensor configured to detect depression and release of the brake pedal by a driver,
   wherein the at least one sensor detects the pressure medium surplus in the brake-by-wire operation in response to the sensor detecting the depression of the brake pedal by the driver before the brake-by-wire operation, and the separating valve is controlled to open the connection in response to detection of release of the brake pedal by the driver.

8. The braking system of claim 4, wherein the separating valve is controlled to open the connection between the wheel brake and the master brake cylinder in response to detecting the pressure medium surplus in the brake-by-wire operation and discharge the pressure medium surplus to the pressure medium reservoir via the hydraulic line, compress the elastic element within the master brake cylinder to the rest position at which the secondary passage bore is opened to the secondary pressure chamber, and to discharge the pressure medium surplus to the pressure medium reservoir via the pressure-balancing line.

9. The braking system of claim 4, further comprising:
   a return line connecting the pressure medium reservoir to the hydraulic line; and a plurality of outlet valves, each outlet valve among the plurality of outlet valves respectively disposed between the pressure medium reservoir and a respective wheel brake of the hydraulically actuatable wheel brakes along the return line, wherein the separating valve is controlled to open the connection between the wheel brake and the master brake cylinder in response to detecting the pressure medium surplus in the brake-by-wire operation and discharge the pressure medium surplus to the pressure medium reservoir via the hydraulic line, the master brake cylinder, and the pressure-balancing line without opening the plurality of outlet valves.

10. The braking system of claim 9, when the plurality of outlet valves regulate braking with different wheel brake pressures for each wheel brake of the hydraulically actuatable wheel brakes, pressure medium is discharged from the hydraulically actuatable wheel brakes via the plurality of outlet valves and the return line into the pressure medium reservoir.

* * * * *